United States Patent [19]
Nunnally

[11] Patent Number: 5,823,474
[45] Date of Patent: Oct. 20, 1998

[54] AIRCRAFT ICE DETECTION AND DE-ICING USING LASERS

[75] Inventor: William C. Nunnally, Columbia, Mo.

[73] Assignee: SunLase, Inc., Tulsa, Okla.

[21] Appl. No.: 706,598

[22] Filed: Sep. 5, 1996

[51] Int. Cl.[6] .................................................. B64D 15/00
[52] U.S. Cl. .................................. 244/134 E; 244/134 E
[58] Field of Search ........................... 244/134 R, 134 E, 244/134 D, 134 F; 219/121.6, 121.61, 121.62, 121.65, 121.81; 340/580

[56] References Cited

U.S. PATENT DOCUMENTS

| | | | |
|---|---|---|---|
| 3,540,025 | 11/1970 | Levin et al. ............................. | 244/134 |
| 4,274,091 | 6/1981 | Decker .................................... | 340/583 |
| 4,378,755 | 4/1983 | Magnusson et al. ................... | 118/684 |
| 4,379,217 | 4/1983 | Youmans ................................. | 218/121 |
| 4,549,079 | 10/1985 | Terasaka et al. ....................... | 250/339 |
| 4,720,621 | 1/1988 | Langen ................................... | 219/121.6 |
| 4,737,628 | 4/1988 | Lovoi ...................................... | 219/121.62 |
| 4,808,824 | 2/1989 | Sinnar .................................... | 250/339 |
| 4,900,891 | 2/1990 | Vega et al. ............................. | 219/121.6 |
| 5,061,836 | 10/1991 | Martin .................................... | 219/10.55 M |
| 5,180,122 | 1/1993 | Christian et al. ...................... | 340/583 |
| 5,218,206 | 6/1993 | Schmitt et al. ......................... | 250/339 |
| 5,272,340 | 12/1993 | Anbar ..................................... | 250/332 |
| 5,318,254 | 6/1994 | Shaw et al. ........................... | 244/134 R |
| 5,400,144 | 3/1995 | Gagnon .................................. | 340/583 |
| 5,409,537 | 4/1995 | Poullos et al. ......................... | 118/641 |
| 5,417,389 | 5/1995 | Chew et al. ........................... | 244/134 R |
| 5,449,882 | 9/1995 | Black et al. ........................... | 219/121.83 |
| 5,500,502 | 3/1996 | Horita et al. .......................... | 219/121.63 |
| 5,597,140 | 1/1997 | Madsen ................................. | 244/134 R |

FOREIGN PATENT DOCUMENTS

7800071  6/1979  WIPO .

*Primary Examiner*—Lissi Mojica
*Attorney, Agent, or Firm*—Mark A. Rogers; Gary N. Speed; Mark M. Henry

[57] ABSTRACT

An aircraft ice detection and de-icing system is disclosed in which an aircraft is positioned remotely from a laser beam generator, a beam of radiant energy is reflected from a mirror so that the beam impinges upon and creates a footprint upon a surface of the aircraft and the mirror is manipulated to move the footprint about the aircraft surface. The beam has a wavelength that is preferentially reflected by the aircraft surface and absorbed by ice, snow and water, so the beam heats and removes ice, snow and water from aircraft surfaces as the beam's footprint is moved thereabouts. A remote thermal monitoring system may also be used to monitor temperatures at the aircraft surface for detecting regions experiencing temperature rises at relatively increased rates as the regions are treated with the beam, thereby indicating the presence of ice, snow or water. A visible light may also be used simultaneously to track and indicate movement of the footprint of the treating beam about the aircraft surface.

19 Claims, 3 Drawing Sheets

AIRCRAFT ICE DETECTION AND DE-ICING USING LASERS

BACKGROUND OF THE INVENTION

This invention relates to aircraft ice detection and de-icing, and more particularly, to a system and method of ice detection and de-icing using lasers.

Ice formation on aircraft surfaces, particularly wing surfaces, during cold weather is a problem that can have catastrophic consequences. Ice increases aircraft weight and can reduce lift and interfere with the functioning of moving parts. A number of systems are available and in use for preventing icing or for de-icing an aircraft surface while an aircraft is in flight. Fewer options are available for detecting and removing ice from an aircraft surface while the aircraft is on the ground. Conventional aircraft de-icing systems for use on the ground are largely limited to the use of large quantities of glycol-based solutions to reduce the freezing point of ice, snow or water on an aircraft surface. During icing conditions, an aircraft waiting for take-off in a parking area is typically sprayed with a mixture of water and ethylene glycol. An aircraft must often wait in line on a runway several minutes before being cleared for take-off, and during this wait, ice may of course reform on regions of the aircraft surface. When this occurs, the aircraft must be removed from the line, returned to the de-icing area and treated again.

It has been proposed to use laser light to de-ice an aircraft, using complex, bulky and cumbersome booms to hold laser light generators in close proximity to an aircraft surface and to manipulate the laser light generators about the aircraft surface to be de-iced. While this approach might reduce or eliminate the need to spray outer surfaces with glycol solutions, it is not without problems. For example, the need to physically manipulate the laser generators about the aircraft surface would appear to require a relatively long amount of time to treat an entire aircraft and would appear to significantly limit the flexibility of the system to de-ice hard to reach regions of an aircraft surface.

Similarly, it has been proposed to use various electro-optical measurement systems for the remote detection of ice on a surface such as an aircraft surface. These systems typically rely upon changes in the phase of reflected optical energy that is related to the thickness of the ice on the surface. Phase sensitive ice detection systems are extremely sensitive but are subject to many situations that inject phase differences, causing inaccuracies.

SUMMARY OF THE INVENTION

It is therefore an object of the present invention to provide a system and method of de-icing an aircraft surface using a laser beam.

It is a further object of the present invention to provide a system and method of the above type that allows the laser beam generator to be disposed remotely from the aircraft to be de-iced.

It is a still further object of the present invention to provide a system and method of the above type that permits the laser beam generator to remain stationary as the beam is moved about the aircraft surface.

It is a still further object of the present invention to provide a system and method of the above type that permits the laser beam generator to be disposed near or below the ground or deck.

It is a still further object of the present invention to provide a system and method of the above type that permits simple telescopic frames or towers to be positioned alongside decks such as ramps and runways for use with the ice detection and de-icing system.

It is a still further object of the present invention to provide a system and method of the above type that provides great flexibility in treating hard to reach regions of an aircraft surface.

It is a still further object of the present invention to provide a system and method of the above type in which the directivity of the laser permits the laser to reach and treat interior compartments such as air brakes and ailerons when they are opened during de-icing.

It is a still further object of the present invention to provide a system and method of the above type in which underside illumination may be used to treat landing gear and other lower areas of an aircraft.

It is a still further object of the present invention to provide a system and method of the above type that permits a beam generated by a single laser beam generator to quickly and easily treat a large region on an aircraft surface without regard for whether the region is horizontal, vertical, sloping, rounded or any combination thereof.

It is a still further object of the present invention to provide a system and method of the above type in which a mirror is manipulated to move the footprint of the beam about an aircraft surface.

It is a still further object of the present invention to provide a system and method of the above type that provides for simultaneous remote ice detection.

It is a still further object of the present invention to provide a system and method of the above type that uses the absorptive properties of ice, snow and water relative to the absorptive properties of an aircraft surface to remotely detect ice on the aircraft surface.

It is a still further object of the present invention to provide a system and method of the above type that monitors temperatures at the aircraft surface to remotely detect ice, snow or water thereon.

It is a still further object of the present invention to provide a system and method of the above type that remotely detects the presence of ice, snow or water on an aircraft surface by monitoring for regions experiencing temperature rises at relatively increased rates.

It is a still further object of the present invention to provide a system and method of the above type that provides for simultaneous use of a visible light source to track the footprint of the treating beam about the aircraft surface to provide a visible indication of the region a being treated.

It is a still further object of the present invention to provide a system and method of the above type in which laser intensity is controllable in sub-second time scales such that the laser power can be quickly adjusted over a large range.

Toward the fulfillment of these and other objects and advantages, the aircraft ice detection and de-icing system of the present invention involves positioning an aircraft remotely from a laser beam generator, reflecting a beam of radiant energy from a mirror so that the beam impinges upon and creates a footprint upon a surface of the aircraft and manipulating the mirror to move the footprint about the aircraft surface. The beam has a wavelength that is preferentially reflected by the aircraft surface and absorbed by ice, snow and water, so the beam heats and removes ice, snow and water from the aircraft surface as the beam's footprint is moved thereabouts. A remote thermal monitoring system may also be used to monitor temperatures at the aircraft surface for detecting regions experiencing temperature rises at relatively increased rates as the regions are treated with the beam, thereby indicating the presence of ice, snow or water. A visible light may also be used simultaneously to track and indicate movement of the footprint of the treating beam about the aircraft surface.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
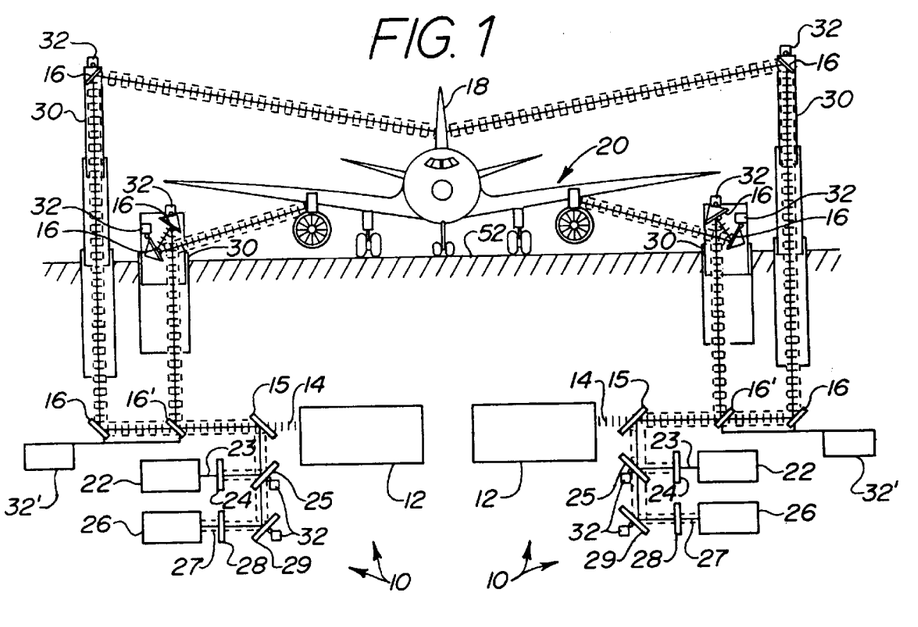
FIG. 1 is a front elevation view of an ice detection and de-icing system of the present invention.
Figure 2:
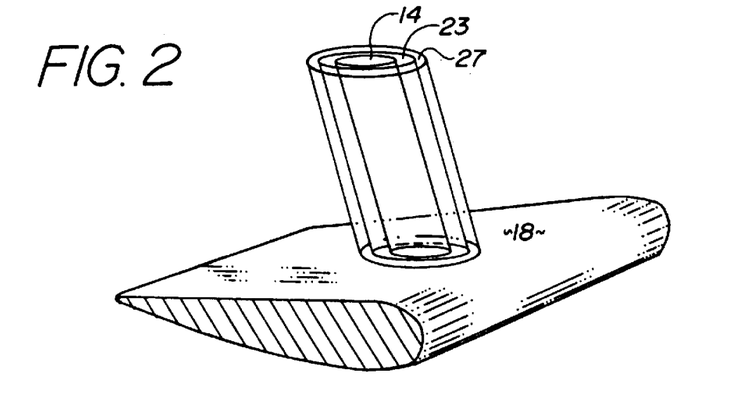
FIG. 2 is a view showing overlapping footprints created on an aircraft surface by a laser beam and visible light source in accordance with a system of the present invention.

Referring to FIG. 1, the reference numeral 10 refers in general to ice detection and de-icing systems of the present invention. A laser beam generator 12 generates a laser beam 14 which passes through a window 15 with wavelength selective layers on the front surface of the window 15 and is reflected by mirrors 16 to a surface 18 of an aircraft 20. An infrared thermal camera 22 of a thermal monitoring system operating at a wavelength much less than the high power beam 14 views a reflected beam or image 23 from the same area illuminated by the beam 14 beam. The image 23 is reflected from the aircraft surface 18 to the mirrors 16 and window 15 which direct the image 23 through a near infrared narrow band transmission filter 24 and to the infrared thermal camera 22. A visible light source 26 generates a visible light beam 27 which passes to and is reflected by visible mirror 29 through the beam splitter 25 and is reflected by window 15 and mirrors 16 to the aircraft surface 18. Telescopic poles or frames 30 support mirrors 16, and drivers, motors and/or sensors, referred to individually or collectively as numeral 32, manipulate or move the mirrors 16 to move the beams 14 and 27 and image 23 about the aircraft surface 18. In an alternate embodiment, window 15 is not used, and the thermal image 23 and visible beam 27 follow a separate but parallel path, using the same mirrors 16.

The laser beam generator 12, preferably a $CO_2$ laser beam generator, is used to generate an efficient, high power, infrared laser beam 14. The laser efficiency is preferably within a range of approximately 30% to approximately 50%, and more preferably approximately 50%. It is understood that other laser beam generators may be used. For example, a carbon monoxide laser beam generator may generate a beam approximately in the range of approximately 9 to approximately 10 micron wavelength that has similar efficiencies. The power of the generated beam 14 is preferably substantially within a range of approximately 50 kW to approximately 100 kW and is more preferably approximately 100 kW. The wavelength of the beam 14 is selected from a range that is preferentially reflected by the aircraft surface 18 and absorbed by ice, snow and water 33. The wavelength is preferably substantially within a range of approximately 8 microns to approximately 15 microns, is more preferably substantially within a range of approximately 10 microns to approximately 11 microns.

Figure 5:
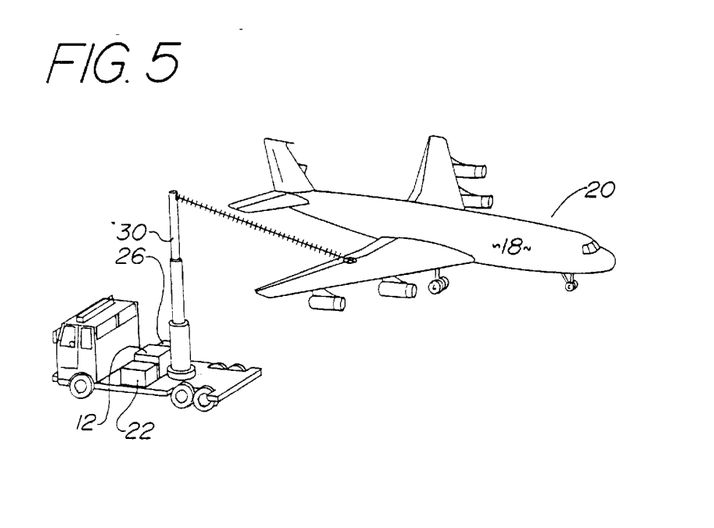
FIG. 5 is an elevated perspective view of an alternate embodiment of an ice detection and de-icing system of the present invention.

The optical absorption depth of a beam 14 having a wavelength of approximately 10 microns to 11 microns in ice, snow and water 33 is approximately 0.1 mm, so the infrared optical energy is absorbed at the surface of the ice, snow or water, and the ice, snow or water is melted or evaporated selectively without significant amounts of the optical energy reaching the aircraft surface 18. In contrast, the metals comprising much of the aircraft surface 18 reflect approximately 90% to approximately 95% of optical energy at a wavelength of approximately 10 microns to approximately 11 microns, so little of the optical energy is absorbed by the metal surfaces, making it possible to use such beams without significantly increasing the temperature of such metal surfaces. Composite structures located at various portions or regions of an aircraft surface 18 may be painted with a metal pigment paint to reflect the optical energy. Also, the optical absorption depth of 10 to 11 micron energy in plastic and glass is approximately 1 to 2 mm, so passengers and pilots are protected from scattered light in the unlikely event that the beam 14 is accidentally pointed at an aircraft window. Also, thermal beam imaging permits the laser beam 14 to be turned off in sub-second time scales. Similarly, work crews may be protected using protective clothing, optical glasses or goggles and helmets as would typically be worn in cold weather. As shown in FIG. 5, because $CO_2$ laser systems are compact and efficient, small lasers can be used that can be mounted in a truck 34 with a turbine generator and used to de-ice engines and running gear at gates and other locations.

Figure 3:
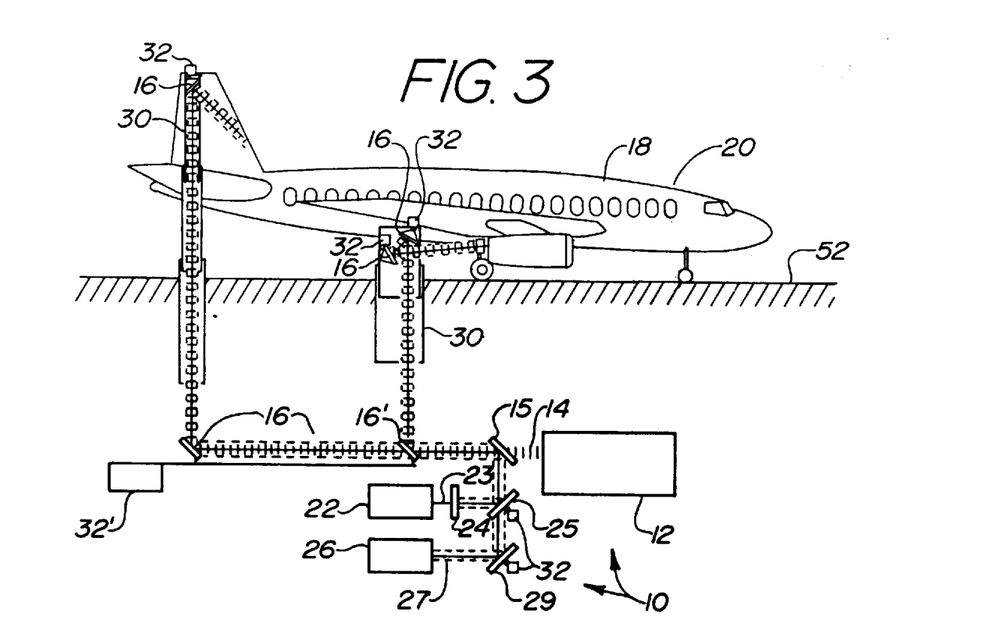
FIG. 3 is a side elevation view of an ice detection and de-icing system of the present invention.

The mirrors 16 are high average power metal mirrors, such as cooled copper mirrors, similar to those developed by the military for directing laser beams in applications such as anti-missile systems for aircraft. The metal mirrors 16 expand the 50 kW laser beam 14 such that the intensity or power density is approximately equivalent to 100 $kW/m^2$, or about 100 times that of sunlight at sea level on the equator. The mirrors 16 reflect the beams 14 and 27 toward the aircraft surface 18 so that the beams 14 and 27 impinge upon and create overlapping footprints 36 and 40, respectively, on the aircraft surface having an area of approximately 0.5 $m^2$. Drivers or motors 32 are used to align and control movements of the mirrors 16 to permit the mirrors to move the reflected beams 14 and 27 so that the footprint of each beam may be moved about the aircraft surface. The speed at which the footprints 36 and 40 will move across the surface 18 will vary depending upon such things as ice thickness and other conditions but can easily fall within a range of approximately 1 m/s to approximately 10 m/s. As shown in FIGS. 1 and 3, movable mirrors 16' are controlled by drivers or controllers 32' to direct the beams 14 and 27 to move the beams 14 and 27 and image 23 across the aircraft surface 18.

Telescopic beam transport frames 30 provide for easy treatment of upper and lower surfaces of an aircraft 20, and the heights of the frames may be adjusted as desired for aircraft 20 of different shapes, sizes and heights. An upper mirror 16 and driver 32 are supported near the top of a frame 30 for reflecting the beams 14 and 27 and image 23 to and from an aircraft 20 and for moving footprints 36, 38 and 40 of the beams and image about an aircraft surface 18. An inner bore or channel 42 extends through a central portion of the frame 30 over substantially the entire length of the frame 30, and one or more lower mirrors 16 is disposed near or below the bottom of the frame 30 and aligned for reflecting beams 14 and 27 from sources 12, 22 and 26 through the bore 42 to the upper mirror 16. As shown in FIGS. 1 and 3, a series of frames 30 may be positioned in a gauntlet at or near an entrance to a runway.

For remote detection of ice, the present invention uses a thermal monitoring system that is not phase sensitive and that instead relies upon the difference in absorption characteristics of ice, snow and water 33 as compared to the underlying aircraft surface 18. As mentioned earlier, the wavelength of the beam 14 is selected from a range that is preferentially reflected by the aircraft surface 18 and absorbed by ice, snow and water 33. In that regard, for a beam 14 having a wavelength within a range of approximately 10 microns to approximately 11 microns, the aircraft surface 18 reflects such a beam 14 with approximately 90% to 95% efficiency, whereas ice, snow and water strongly absorb such radiation. Accordingly, as the beam 14 scans the aircraft surface 18, regions of the aircraft surface that are covered with ice, snow or water 33 will experience temperature rises at relatively increased rates as compared to regions clear thereof.

Figure 4:
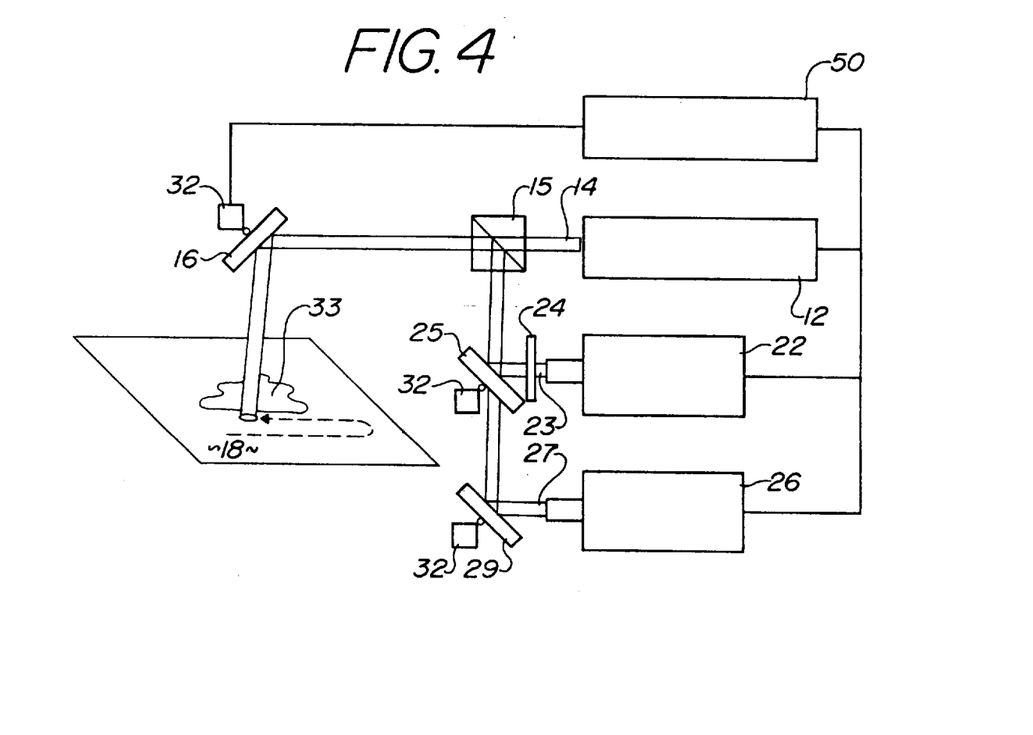
FIG. 4 is a schematic view of an ice detection and de-icing system of the present invention.

The present thermal monitoring system uses an infrared thermal camera 22 that views the same areas being illuminated by beam 14. The wavelength of the image or beam 23 is preferably within a range of approximately 1 to 2 microns. As best shown in FIG. 4, the image 23 is reflected from the aircraft surface 18 and is reflected by mirrors 16, window 15 and near infrared beam splitter 25 through narrow band transmission filter 24 and to the infrared thermal camera 22. The camera 22 can resolve temperature differences of approximately 1 or 2 degrees C. and can create an image of a scanned aircraft surface 18 to highlight regions experiencing temperature rises at relatively increased rates, indicating the presence of ice, snow or water 33 which are preferentially absorbing the long wavelength thermal energy. The thermal monitoring system can therefore be used to detect the presence of ice, snow or water on an aircraft surface 18 and to document the location of the ice, snow or water 33 by imaging the region of interest as it is scanned. The system may also be used to determine ice thickness by determining the time required to melt through the ice to the underlying reflective aircraft surface 18 using a stationary beam 14. Pre-programmed point measurement of ice thickness over the surface can also be used to build a point-by-point map of the surface ice thickness. The remote ice detection and imaging capabilities of the thermal monitoring system also permit the thermal monitoring system to continually monitor the aircraft surface 18 for the presence of ice, snow or water and to verify, confirm or certify that the aircraft 20 is substantially free of ice, snow or water after treatment.

For added safety, a visible light source 26, for example a source of a visible, low power laser beam 27, such as a red HeNe beam having a wavelength of approximately 0.62 microns, may be used in connection with the system to highlight the location of the footprint 36 of beam 14 as the beam 14 footprint 36 scans, or is moved about, the aircraft surface 18. As an alternative, a more efficient semiconductor laser diode may be used to generate the beam 27. The visible beam 27 passes through a visible beam narrow band transmission filter 28, is reflected by visible mirror 29, passes through beam splitter 25 and is reflected by front surface layers of window 15 and mirrors 16 so that it creates a footprint 40 on the aircraft 18 that substantially overlaps with the footprints of beams 14 and 23. The footprint 40 of beam 27 also moves with the footprints 36 and 38 created by beams 14 and image 23 as the footprints scan or move about the aircraft surface 18.

As indicated in FIG. 4, computer based controls 50 may be used for such things as aircraft image recognition, laser or mirror positioning and control, and temperature sensing and imaging. Image recognition may be used to identify the aircraft 20 to be de-iced and to follow a pre-determined scan pattern for a particular type of aircraft. Computer controls 50 also permit instantaneous beam positioning and intensity control for safety purposes. In that regard, the laser intensity is controllable by the computer controls in a sub-second time scale such that the laser power can be adjusted over a large range, such as from approximately 10% to approximately 100% as the beam 14 is scanned across an aircraft. The computerized control 50 permits the system to recognize aircraft type, apply thermal energy in a predetermined pattern, monitor surfaces for ice, snow and water 33, control exposure for instantaneous safety control and certify aircraft condition at the end of the de-icing procedure.

In operation, an aircraft 20 is driven or moved onto a deck 52, such as a taxi way 52a, runway 52b, ramp, tarmac, parking area or other treatment area, and is positioned remotely from the laser beam generator 12, thermal camera and visible light source 26. Computerized image recognition is used to identify the aircraft 20 to be de-iced and to determine the pattern for scanning the aircraft 20 with beams 14 and 27. Beams 14 and 27 from the laser beam generator 12 and visible light source 26 are reflect he mirrors 16 to impinge upon and create substantially overlapping footprints 36 and 40 upon the aircraft surface 18. Reflected image 23 having a footprint 38 is also reflected by the mirrors to the thermal monitoring camera 22. Drivers 32 manipulate the mirrors 16 to move the footprints 36, 38 and 40 of the beams about the aircraft surface in a predetermined pattern. Beam 14 melts or evaporates the ice, snow or water 33 as its footprint moves about the surface 18 of the aircraft, and the thermal monitoring system monitors the aircraft surface for the continued presence of ice, snow or water 33. Unlike radiant systems or laser systems lacking the flexibility to treat hard to reach areas, the directivity of the laser beam 14 permits the present system 10 to treat interior compartments, such as air brakes and aileron, when they air opened during de-icing. In that regard, once the beam 14 enters the interior compartments, it will reflect from the metal surfaces and bounce around the interior compartment to reach most or all of the areas therein.

Upon completion of the predetermined pattern, or upon certification through the thermal monitoring system that the aircraft 20 has been placed in an acceptable condition, the system 10 is deactivated and the aircraft 20 is moved or driven on as desired. Of course, the present ice detection and de-icing system 10 may also by used in combination with other de-icing methods. For example, after de-icing an aircraft 20 using the present system, a light application of chemicals such as a glycol-based solution may be used to deter re-icing.

Figure 6:
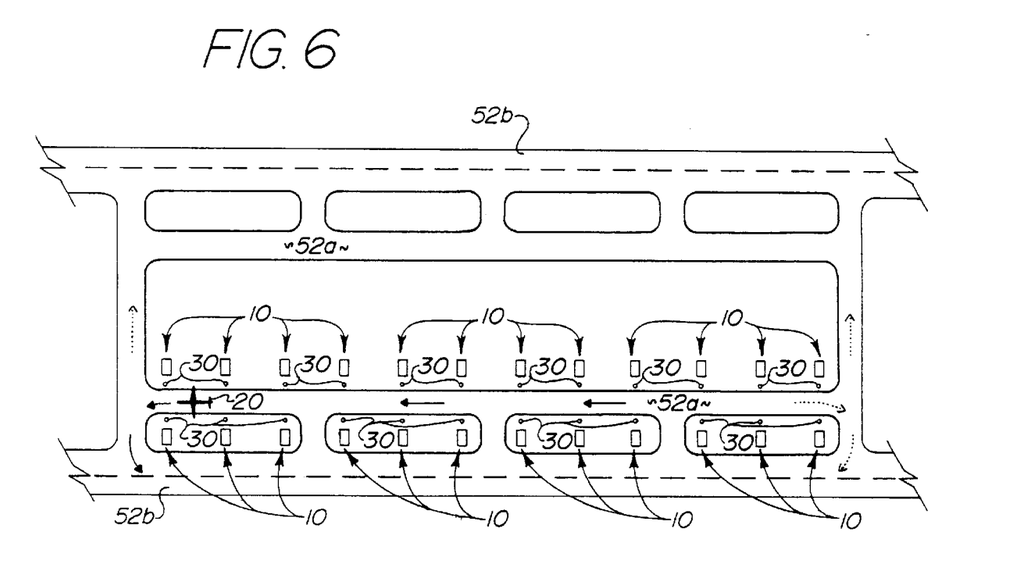
FIG. 6 is an overhead schematic view of a gauntlet using an ice detection and de-icing system of the present invention.

The time needed to de-ice an aircraft will of course depend upon a number of factors, including the amount and thickness of ice present and the number and configuration of systems 10 used. With a number of systems 10 arranged in a gauntlet configuration such as shown in FIG. 6, approximately 5 to 20 minutes should provide sufficient time for de-icing. As best shown in FIG. 6, multiple systems 10 may be deployed along both sides of a taxi way 52a to de-ice aircraft 20 and to maintain aircraft in acceptable condition up until the time the aircraft enters the main runway 52b for takeoff. This deployment also permits takeoff in either direction shortly after de-icing. The use of multiple systems provides redundancy and permits de-icing to be performed over longer periods of time if necessary or desirable.

The theoretical cost of electricity and the size of the laser required to perform melt and vaporize ice in 10 minutes according to the present invention for a wing section that is 1 m by 20 m and that has a 1 cm layer of ice is calculated as illustrated in Table 1 below. For comparison purposes, Table 2 includes the theoretical cost of electricity and size of laser required to instead raise the temperature of a 1 m by 20 m wing section having an effective thickness of 0.5 m for melting a 1 cm layer of ice 1 in 10 minutes.

TABLE I

Theoretical Calculation of Laser Power Requirements and Electric Power Costs

Laser Power Required to Melt Ice According to the Present Invention

| | | |
|---|---|---|
| Ice thickness (m) | 0.01 | |
| Wing area height (m) | 1.00 | |
| Wing area length (m) | 20.00 | |
| Volume of ice (m$^3$) | 0.20 | |
| Mass of ice (kG) @ 997.1 kG/m$^3$ | 199.42 | |
| Melting energy required (J) @ 333 kJ/kG | 6.64 | E + 07 |
| De-ice time (min.) | 10 | |
| Average laser power required to melt ice (kW) | 110.68 | |
| Efficiency of transport 0.75 | | |
| Efficiency of absorption | 0.75 | |
| Average laser power required from laser (kW) | 98.4 | |
| Laser efficiency | 0.33 | |
| Average electrical power required (kW) | 298 | |
| Average electrical power required (MW) | 0.298 | |
| Energy required (kW-hr) | 99.4 | |
| Energy costs ($/kW-hr) | 0.08 | |
| Electrical energy costs of melting ice | $7.95 | |

Laser Power Required to Vaporize Ice According to Present Invention

| | | |
|---|---|---|
| Mass of ice (kG) | 199.42 | |
| Specific energy of vaporization (kJ/kG) | 2,250 | |
| Energy required for vaporization (kJ) | 4.49 | E + 05 |
| Energy required for melting (kJ) | 6.64 | E + 04 |
| Total energy to melt and vaporize (kJ) | 5.15 | E + 05 |
| De-ice time (min.) | 10 | |
| Power required to melt and vaporize (kW) | 859 | |
| Efficiency of transport | 0.75 | |
| Efficiency of absorption | 0.75 | |
| Average laser power required from laser (kW) | 1,530 | |
| Laser efficiency | 0.33 | |
| Average electrical power required (kW) | 4,630 | |
| Average electrical power required (MW) | 4.63 | |
| Energy required (kW-hr) | 771 | |
| Energy costs ($/kW-hr | 0.08 | |
| Electrical energy cost of melting and vaporizing | $61.68 | |

TABLE II

Theoretical Calculation of Laser Power Requirements and Electric Power Costs

Laser Power Required to Raise Temperature of Wing

| | | |
|---|---|---|
| Wing temperature (°F.) | 10.00 | |
| Wing temperature (°C.) | −12.22 | |
| Desired wing temperature (°F.) | 41.00 | |
| Desired wing temperature (°C.) | 5.00 | |
| Effective thickness aluminum wing (m) | 0.50 | |

TABLE II-continued

Theoretical Calculation of Laser Power Requirements and Electric Power Costs

Laser Power Required to Raise Temperature of Wing

| | | |
|---|---|---|
| Effective length of aluminum wing (m) | 20.00 | |
| Effective width of aluminum wing (m) | 1.00 | |
| Effective volume of aluminum wing (m$^3$) | 10.00 | |
| Density of aluminum (kG/m$^3$) | 2,300 | |
| Mass of aluminum (kG) | 23,000 | |
| Specific heat of aluminum (kJ/kG-°C.) | 1.05 | |
| Specific heat of ice (kJ/kG-°C.) | 4.18 | |
| Energy necessary to raise wing temperature (J) | 5.37 | E + 08 |
| Time to raise temperature of wing (min.) | 10 | |
| Average optical power required at surface (kW) | 894 | |
| Efficiency of transport | 0.75 | |
| Efficiency of absorption | 0.75 | |
| Average laser power required from laser (kW) | 1,590 | |
| Laser efficiency | 0.33 | |
| Average electrical power required (kW) | 4,820 | |
| Average electrical power required (MW) | 4.82 | |
| Energy required (kW-hr) | 803 | |
| Energy costs ($/kW-hr) | 0.08 | |
| Electrical energy cost to raise wing temperature | $64.25 | |

The above results indicate that several hundred kilowatts are required to melt or melt and vaporize the ice in 10 minutes and that the energy required to melt the ice according to the present invention is significantly less than that required to melt the ice by raising the temperature of the wing, although the electrical energy cost is low in both cases. The calculations suggest that a de-icing system of the present invention is feasible because commercially available $CO_2$ lasers are presently on the market with average power levels of 50 kW and larger, and lasers having power levels of several megawatts are presently in use for military purposes. The calculations suggest that the use of multiple lasers is desirable, requiring total power levels of several megawatts, which should be easily within the capability of typical power systems.

Other modifications, changes and substitutions are intended in the foregoing, and in some instances, some features of the invention will be employed without a corresponding use of other features. For example, although the present invention is described for use in connection with aircraft 20, the system may be used to detect and remove ice, snow and water 33 from other surfaces, as well. Also, the system may be used in connection with the removal of substances other than or in addition to ice, snow and water. Further, the ice detection system may be used regardless of whether a laser beam 14 or visible light source 26 is used for de-icing the aircraft surface 18. Similarly, the de-icing system may be used without using the ice detection system described and without using the accompanying visible light source 26 for tracking. Further still, the ice detection system may operate independently of the de-icing system, and beam 23 need not track beam 14 as the footprints 38 and 36 of the image and beam move about the aircraft surface 18. Also, any number of different frames 30 or supports may be used for supporting mirrors 16 above the deck, and the frames 30 or supports need not be telescopic and need not have an inner bore 42. Although a $CO_2$ laser beam 14 is preferred, any number of suitable coherent beams of radiant energy may be used, including but not limited to CO lasers. Also, although the beams 14 and 27 are shown as traveling over the same path over much of their lengths, separate mirror or optical systems may be used for one or more of the beams. Of course, measurements and other numerical values given in connection with such things as preferred ranges for

What is claimed is:

1. A method of de-icing an aircraft comprising:

(a) positioning an aircraft to be de-iced remotely from a laser beam generator;

(b) reflecting a first beam of radiant energy generated by said laser beam generator from a first mirror so that said reflected first beam impinges upon and creates a first footprint upon a surface of said aircraft, said first beam having a first wavelength substantially within a range that is preferentially reflected by said aircraft surface and absorbed by ice, snow or water on said aircraft surface; and (c) manipulating said first mirror to move said first footprint about said aircraft surface for removing ice, snow or water from said aircraft surface.

2. The method of claim 1 wherein said first wavelength is substantially within a range of approximately 8 microns to 15 microns.

3. The method of claim 2 further comprising monitoring temperatures at said aircraft surface to detect regions experiencing temperature rises at relatively increased rates.

4. The method of claim 1 further comprising:

providing an ice detection system disposed remotely from said aircraft; and monitoring said aircraft surface for the presence of ice, snow or water.

5. The method of 4 wherein:

said ice detection system comprises a thermal monitoring system that uses an infrared thermal camera to analyze a reflected image having a second wavelength to monitor temperatures at said aircraft surface; and said step of monitoring said aircraft surface for the presence of ice, snow or water comprises monitoring temperatures at said aircraft surface to detect regions experiencing temperature rises at relatively increased rates.

6. The method of claim 5 wherein said first wavelength is substantially within a range of approximately 8 microns to approximately 15 microns and said second wavelength is substantially within a range of approximately 0.8 microns to approximately 2.2 microns.

7. The method of claim 1 further comprising:

reflecting a second beam of radiant energy, having a second wavelength substantially within a range of visible light, from said first mirror so that said reflected third beam impinges upon and creates a third footprint upon a surface of said aircraft that at least in part overlaps said first footprint.

8. The method of claim 5 wherein said reflected image has a second footprint on said aircraft surface that at least in part overlaps said first footprint, and further comprising:

reflecting a second beam of radiant energy, having a third wavelength substantially within a range of visible light, from said first mirror so that said reflected second beam impinges upon and creates a third footprint upon said aircraft surface that at least in part overlaps said first and second footprints.

9. The method of claim 1 further comprising:

positioning said laser beam generator substantially below said aircraft;

supporting said first mirror from a first frame having an inner bore; and passing said first beam through said bore of said first frame before said first beam strikes said first mirror.

10. The method of claim 9, further comprising:

supporting a second mirror from a second frame at a height lower than said first mirror, said second frame having an inner bore;

reflecting a third beam of radiant energy generated by said laser beam generator from a second mirror, after passing through said bore of said second frame, so that said reflected third beam impinges upon and creates a fourth footprint upon a surface of said aircraft, said third beam having a fourth wavelength substantially equal to said first wavelength; and manipulating said second mirror to move said fourth footprint about said aircraft surface for removing ice, snow or water from said aircraft surface.

11. A system for de-icing an aircraft, comprising:

(a) a deck for supporting an aircraft to be de-iced;

(b) a laser beam generator for generating a first beam of radiant energy having a wavelength substantially within a range of approximately 8 microns to approximately 15 microns, said generator being disposed remotely from said aircraft, near or below said deck and in a substantially stationary position relative to said deck;

(c) a frame having an inner bore, at least a portion of said frame extending above said deck;

(d) a first mirror supported above said deck by said first frame for reflecting said first beam toward said aircraft to create a first footprint upon a surface of said aircraft;

(e) a driver operatively connected to said first mirror to manipulate said first mirror for moving said footprint about said surface of said aircraft; and (f) a second mirror disposed near a lower portion of said frame and positioned to reflect said first beam from said generator, through said bore and to said first mirror.

12. The system of claim 11, further comprising:

an infrared thermal camera disposed remotely from said aircraft, near or below said deck and in a substantially stationary position relative to said deck, said camera analyzing a reflected image having a second wavelength for measuring temperatures at said aircraft surface, and said camera being aligned to receive said reflected image having a second footprint upon said aircraft surface after said reflected image is reflected from said first mirror, through said bore and from said second mirror.

13. The system of claim 12, further comprising:

a light source for generating a second beam of radiant energy, having a third wavelength substantially within a range of visible light, disposed remotely from said aircraft, near or below said deck and in a substantially stationary position relative to said deck, said light source being aligned to direct said third beam to said second mirror, through said bore and to said first mirror which reflects said third beam toward said aircraft to create a third footprint upon said surface of said aircraft.

14. The system of claim 13 wherein said frame is telescopic and permits height adjustments of said first mirror.

15. A method for detecting ice, snow or water on an aircraft, comprising:

(a) scanning a surface of an aircraft with a first beam of radiant energy having a first wavelength substantially within a range that is preferentially reflected by said aircraft surface and absorbed by ice, snow or water; and (b) monitoring temperatures at said aircraft surface to detect regions experiencing temperature rises at relatively increased rates, thereby indicating the presence of ice, snow or water at said regions.

16. The method of claim 15 wherein step (b) comprises analyzing a reflected image from said aircraft surface with an infrared thermal camera to monitor temperatures at said aircraft surface, said reflected image having a second wavelength that is smaller than said first wavelength.

17. The method of claim 16 wherein said first beam and said reflected image impinge upon and create first and second footprints upon said aircraft surface, said first footprint overlapping at least in part with said second footprint.

18. The method of claim 15 wherein said first wavelength is substantially within a range of approximately 8 microns to approximately 15 microns.

19. The method of claim 16 wherein said first wavelength is substantially within a range of approximately 8 microns to approximately 15 microns and said second wavelength is substantially within a range of approximately 0.8 microns to approximately 2.2 microns.

* * * * *

UNITED STATES PATENT AND TRADEMARK OFFICE
CERTIFICATE OF CORRECTION

PATENT NO. : 5,823,474
DATED : October 20, 1998
INVENTOR(S) : William C. Nunnally It is certified that error appears in the above-identified patent and that said Letters Patent is hereby corrected as shown below:

Title page, item [56], on the line following the citation to "5,500,502 3/1996 Horita et al. .......................219/121.63", insert --5,500,530 3/1996 Gregoris ................250/339.11--.

In column 6, line 35, "reflect he" should be --reflected by the--.

In column 9, line 3 of claim 7, "second wavelength" should be --third wavelength--.

In column 9, line 5 of claim 7, "third beam" should be --second beam--.

Signed and Sealed this

Twenty-seventh Day of April, 1999

*Attest:*

Q. TODD DICKINSON

*Attesting Officer*  *Acting Commissioner of Patents and Trademarks*